(12) United States Patent
Carmichael et al.

(10) Patent No.: US 10,405,566 B2
(45) Date of Patent: Sep. 10, 2019

(54) SCAVENGING OXYGEN

(75) Inventors: Adrian John Carmichael, Yorkshire (GB); Andrew Elkin, Merseyside (GB); Mark Frost, Buxton Derbyshire (GB); Steven John Moloney, Merseyside (GB); Andrew Stuart Overend, Bolton (GB); Steven Burgess Tattum, Lancashire (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 0 days.

(21) Appl. No.: 14/240,548

(22) PCT Filed: Aug. 21, 2012

(86) PCT No.: PCT/GB2012/052040
§ 371 (c)(1),
(2), (4) Date: Apr. 29, 2014

(87) PCT Pub. No.: WO2013/027049
PCT Pub. Date: Feb. 28, 2013

(65) Prior Publication Data
US 2014/0295028 A1  Oct. 2, 2014

Related U.S. Application Data

(60) Provisional application No. 61/527,225, filed on Aug. 25, 2011.

(51) Int. Cl.
*A23L 3/3436* (2006.01)
*B65D 81/26* (2006.01)
*A23L 2/42* (2006.01)
*A23L 2/44* (2006.01)
(Continued)

(52) U.S. Cl.
CPC ............... *A23L 3/3436* (2013.01); *A23L 2/42* (2013.01); *A23L 2/44* (2013.01); *B65D 81/26* (2013.01); *C12H 1/14* (2013.01); *B65D 51/244* (2013.01); *Y10T 428/12028* (2015.01); *Y10T 428/13* (2015.01); *Y10T 428/24967* (2015.01); *Y10T 428/31928* (2015.04)

(58) Field of Classification Search
CPC . A23L 3/3436; A23L 2/42; A23L 2/44; B65D 51/244; B65D 81/26; C12H 1/14; Y10T 428/31928; Y10T 428/13; Y10T 428/24967; Y10T 428/12028
See application file for complete search history.

(56) References Cited

U.S. PATENT DOCUMENTS

| 4,279,350 A | 7/1981 | King |
| 2010/0028499 A1* | 2/2010 | Rule .................... A23L 3/3436 426/106 |

FOREIGN PATENT DOCUMENTS

| EP | 2236284 A1 | 10/2010 |
| JP | 55-94641 | 7/1980 |
| JP | 3-284347 | 12/1991 |

(Continued)

*Primary Examiner* — Peter F Godenschwager
*Assistant Examiner* — Andrew J. Oyer
(74) *Attorney, Agent, or Firm* — Fay Sharpe LLP

(57) ABSTRACT

A container (22) includes an oxygen-sensitive beverage, for example a vitamin C-containing beverage. A closure (40) seals the mouth (28) of container (22). The closure includes an oxygen scavenging structure, for example a closure, which comprises a hydrogen generating means and a catalyst for catalysing a reaction between hydrogen and oxygen.

21 Claims, 6 Drawing Sheets

(51) Int. Cl.
*C12H 1/14* (2006.01)
*B65D 51/24* (2006.01)

(56) References Cited

FOREIGN PATENT DOCUMENTS

| | | | |
|---|---|---|---|
| JP | 2001-525449 | A | 12/2001 |
| JP | 2010-210171 | A | 9/2010 |
| WO | 9902419 | A1 | 1/1999 |
| WO | 2008090354 | A1 | 7/2008 |
| WO | 2010/116192 | A1 | 10/2010 |
| WO | 2010115992 | A1 | 10/2010 |
| WO | 2010116194 | A1 | 10/2010 |
| WO | WO2010115992 | * | 10/2010 |

* cited by examiner

SCAVENGING OXYGEN

This invention relates to scavenging oxygen and particularly, although not exclusively, relates to the scavenging of oxygen in containers, for example food or beverage containers.

WO2008/090354A describes a container comprising a hydrogen generating means for generating molecular hydrogen in a chemical reaction involving an active substance incorporated in the container. A catalyst is associated with the container for catalyzing a reaction between the molecular hydrogen and molecular oxygen which enters the container, thereby to scavenge the oxygen and protect the contents of the container against degradation due to and/or associated with the presence of oxygen. Thus, the shelf life of foods and beverages packaged in plastics, for example polyethylene terephthalate containers, can be extended. The specific examples in WO2008/090354A demonstrate the efficacy of the invention, with reference to PET bottles blown from a mixture of PET and palladium catalyst so the catalyst is distributed throughout the bottle wall. Hydrogen is produced from plaques containing sodium borohydride. The bottles are filled with tap water. Results show that there is no measurable increase in oxygen concentration over a test period of two months (Example 12).

WO2010/115992 also relates to the scavenging of oxygen in containers. In this case, a wide range of closures for containers are described. No data is presented on the efficacy of the various closure designs described.

Whilst scavenging oxygen from containers containing foods or beverages which are not very oxygen sensitive is challenging, scavenging oxygen sufficiently quickly from containers which contain very oxygen sensitive consumables (e.g. wine or fruit juices) is even more challenging—oxygen must be scavenged and/or reacted away at a rate which is quicker than the rate of reaction of oxygen with the consumable.

Juices contain vitamin C (ascorbic acid) which is very sensitive to oxygen and to extend the shelf life (before and after initial opening) of packaged juice requires rapid scavenging of oxygen.

FIG. 1 is a schematic representation of a juice bottle incorporating oxygen scavenging technology of the type described in WO2008/090354A and WO2010/115992A. The bottle 2 includes a closure 4 and body 6 containing juice 8 which contains ascorbic acid. The closure 4 incorporates a hydride which generates hydrogen on contact with moisture which fills headspace 9 and the body 6 comprises PET incorporating palladium catalyst. As illustrated, oxygen ($O_2$) permeates the body 6 and hydrogen is generated in the closure. The hydrogen enters the headspace and some dissolves in the juice, which result in hydrogen permeating throughout the entire body 6, whereupon the hydrogen associates with the palladium catalyst, thereby to activate the catalyst. When oxygen permeates the body 6, at any point, it is then close to hydrogen activated catalyst, resulting in a rapid scavenging of the oxygen, so only a very low concentration of oxygen is present in the juice 8, thereby minimising oxygen available to react with the ascorbic acid in the juice. As a result, degradation of the juice is minimised and such protection will remain for as long as the hydride in the closure generates sufficient hydrogen.

Other solutions to the protection of container contents from oxygen include constructing the entire container walls so as to define a gas barrier and prevent oxygen passage into the container. For example, the walls may comprise multiple layers and/or may be coated such as using PLASMAX (Trade Mark) silicone oxide. Another commercially available solution for PET containers involves incorporating an oxidizable polymer (e.g. AMOSORB (Trade Mark)) and catalyst throughout the container wall. Oxygen which permeates the wall is scavenged by reaction with the oxidizable polymer, before it passes into the container contents.

Thus, the commercially available solutions described address the problem by treating the entire container wall to scavenge or block oxygen ingress into the content at the point the oxygen initially comes into contact with the container. Such treatments by definition associate additional materials with, for example, the PET used for the container and this may make recycling of such containers less straight forward compared to a case wherein a container comprising 100% PET was to be recycled.

From the aforesaid, it is expected that protection for oxygen sensitive consumables requires distribution of catalyst over a large surface area and/or throughout the entire wall of the body, so the oxygen can be scavenged rapidly before any significant quantity of oxygen enters the beverage and/or before it reaches the interior of the container. However, the present invention, in one aspect, is based on a surprising discovery which is counter-intuitive to the aforesaid.

In addition, it is desirable for any oxygen scavenging system to be cost-effective and/or it is an ongoing challenge to reduce cost of components used. The present invention, in another aspect, addresses this problem.

It is also an object of the invention to facilitate the incorporation of oxygen scavenging means into containers of a wide range of types.

In general terms, it is an object of the present invention to address problems associated with scavenging oxygen, for example, in food and beverage containers.

According to a first aspect of the invention, there is provided an oxygen scavenging structure (herein referred to as the "OSS"), the OSS comprising:

a hydrogen generating means which includes active material arranged to generate molecular hydrogen on reaction with moisture; and catalyst for catalysing a reaction between hydrogen and oxygen.

A reference to "ppm" herein refers to "parts per million" by weight.

Said OSS may be for attachment to (or may be attached to) any part of a container, for example an internal bottom wall or an internal side wall of, for example, a cup or tray or other container for products such as foods or beverages. The OSS may be for a closure or may be a part of a closure as hereinafter described.

Said OSS preferably includes a first structure area which is defined by a face of the OSS which has the greatest area. Said OSS may include less than 0.10 µg (e.g. less than 0.08 µg or less than 0.06 µg) of catalyst per unit area in (mm$^2$) of said first structure area. The OSS may include at least 0.01 µg, for example at least 0.02 µg of catalyst per unit area (in mm$^2$) of said first structure area.

Said OSS may include less than 0.000200 g, preferably less than 0.000150 g, more preferably less than 0.000100 g of catalyst.

In some embodiments, said OSS may include less than 0.000040 g, suitably less than 0.000035 g, preferably less than 0.000030 g, more preferably less than 0.000025 g, especially less than 0.000020 g of catalyst. In some cases, the OSS may include less than 0.000015 g, less than 0.000010 g or even less than 0.000008 g of catalyst. Said OSS may include at least 0.00000050 g or at least 0.0000010 g of catalyst.

Said OSS may include less than 100 ppm, suitably less than 60 ppm, preferably less than 40 ppm, more preferably less than 20 ppm of catalyst, based on the total weight of said OSS. In especially preferred embodiments, said OSS may include less than 10 ppm, suitably less than 8 ppm, preferably less than 6 ppm, more preferably less than 5 ppm of catalyst, based on the total weight of said OSS. Said OSS may include at least 1 ppm of catalyst.

In order to maximize the efficacy of the catalyst, it is preferred that the catalyst be well dispersed. Said catalyst is suitably heterogeneous. For heterogeneous catalysts, it is preferred that the average catalyst particle size be less than 1 micron, more preferred that average catalyst particle size be less than 100 nanometers, and especially preferred than the average catalyst particle size be less than 10 nanometers. For heterogeneous catalysts, the catalyst particles may be free-standing, or be dispersed onto a support material such as carbon, alumina, or other like materials.

The OSS as described may be of different sizes (e.g. diameters) and shapes and thereby arranged to be associated with, for example secured to, containers or parts thereof of different sizes.

Said catalyst is preferably dispersed within one or more (e.g. two) materials which are integral parts of said OSS. The material or materials within which the catalyst is dispersed preferably occupy a first structure volume within the OSS. The first structure volume may be less than 15000 mm$^3$, less than 10,000 mm$^3$, less than 8000 mm$^3$, less than 7000 mm$^3$, less than 6000 mm$^3$, less than 5000 mm$^3$, less than 4000 mm$^3$, less than 1500 mm$^3$, less than 1200 mm$^3$, less than 1000 mm$^3$, less than 800 mm$^3$, less than 700 mm$^3$, less than 500 mm$^3$ or less than 400 mm$^3$. The first structure volume may be at least 100 mm$^3$, or at least 150 mm$^3$ or at least 200 mm$^3$.

The catalyst volume-area ratio (CVR) is defined herein as follows:

$$CVR(\text{in mm}) = \frac{\text{total volume of material(s) in which catalyst is dispersed(e.g. said first structure volume)}}{\text{the area of a face of said first structure volume which has the greatest area}}$$

Said face is preferably symmetrical about one (preferably two mutually orthogonal) plane(s) which extend(s) perpendicular to said face. Said face may have at least 3 or at least 4 sides—eg it may be square or rectangular.

The area of said face preferably has a substantially circular perimeter. Said area may be annular or circular.

Said CVR may be at least 0.2, or at least 0.3. It is suitably in the range 0.2 to 1.5, preferably 0.8 to 1.2, more preferably 0.9 to 1.1.

The material or materials in which the catalyst is dispersed (e.g. said first structure volume) may include at least 0.005 µg, suitably at least 0.010 µg, preferably at least 0.015 µg of catalyst per unit volume (in mm$^3$) of said material or materials. Where the catalyst is dispersed in two (or more) different materials the µg per unit volume values suitably refer to the total catalyst in the two (or more) layers divided by the total volume (in mm$^3$) occupied by the layers. Said material or materials in which the catalyst is dispersed may include less than 0.20 µg, suitably less than 0.15 µg, preferably less than 0.10 µg, more preferably less than 0.08 µg, especially less than 0.06 µg of catalyst per unit volume (in mm$^3$).

Said first structure volume may include 0.00000050 g to 0.000160 g, suitably 0.00000050 g to 0.00010 g of catalyst. In some cases, said first volume may include 0.00000050 g to 0.000040 g, for example 0.0000010 g to 0.000020 g of catalyst.

Said hydrogen generating means suitably includes a matrix material with which said active material is associated.

Said OSS preferably includes a control means for controlling the passage of moisture, for example water or water vapour (e.g. from material held in use in a container body) to said active material arranged to generate molecular hydrogen. The control means may also restrict migration of materials into the product in the container, in use. Providing a control means as described introduces substantial flexibility which allows control of the rate of production of hydrogen by the hydrogen generating means and tailoring of the time over which hydrogen is generated, which determines the shelf-life of the container. For example, to achieve a long shelf-life a relatively large amount of active material may be associated with a matrix and by controlling passage of moisture to the hydrogen generating means, the rate of hydrogen generation is controlled as is the rate of consumption of the active material. In contrast, in the absence of the control means, the relatively large amount of active material would produce hydrogen at a quicker rate and would be consumed quicker meaning the shelf-life of the container would be less.

Said control means is preferably arranged to control a first evolution ratio, wherein the first evolution ratio is defined as:

$$\frac{\text{the rate of evolution of hydrogen in the container over a selected initial 5 day period}}{\text{the rate of evolution of hydrogen in the container over a second 5 day period starting 85 days after the end of the selected initial period}}$$

Said first evolution ratio is suitably less than 4, preferably less than 3, more preferably less than 2. The ratio is suitably greater than 0.5, preferably greater than 0.8, and more preferably 1 or greater.

Said selected initial 5 day period may be within 45 days, suitably within 30 days, 15 days, 10 days or 5 days of filling of the container, for example with a beverage.

Said control means is preferably arranged to control a second evolution ratio, wherein the second evolution ratio is defined as:

$$\frac{\text{the rate of evolution of hydrogen in the container over a selected initial 5 day period}}{\text{the rate of evolution of hydrogen in the container over a second 5 day period starting 180 days after the end of the selected initial period}}$$

Said second evolution ratio is suitably less than 4, preferably less than 3, more preferably less than 2. The ratio is suitably greater than 0.5, preferably greater than 0.8, and more preferably 1 or greater Said control means is preferably arranged to control a third evolution ratio, wherein the third evolution ratio is defined as:

$$\frac{\text{the rate of evolution of hydrogen in the container}}{\text{the rate of evolution of hydrogen in the}}$$
$$\frac{\text{over a selected initial 5 day period}}{\text{container over a second 5 day period starting}}$$
$$270 \text{ days after the end of the selected initial period}$$

Said third evolution ratio is suitably less than 4, preferably less than 3, more preferably less than 2. The ratio is suitably greater than 0.5, preferably greater than 0.8, and more preferably 1 or greater.

Both the first and second evolution ratios may apply. Preferably, the first, second and third evolution ratios apply.

Suitably, the only path for passage of moisture to the hydrogen generating means is via said control means. Said control means preferably defines an uninterrupted barrier between the hydrogen generating means and a source of moisture in the container.

Unless otherwise stated, water permeability described herein is measured using (American Society for Testing Materials Annual Book of Standards) ASTM procedure E96 Procedure E at 38° C. and relative humidity of 90%.

A said control means is suitably selected so that it defines the rate determining step for passage of moisture, for example water vapour, from the container to the active material. Suitably, the rate of passage of moisture through the control means, towards the hydrogen generating means, is no faster than (e.g. it may be slower than) the rate of passage of water through the hydrogen generating means (e.g. through a matrix material thereof as described below). Preferably, to achieve the aforesaid, the ratio of the water vapour permeability (g·mm/m$^2$·day) of the control means divided by the water vapour permeability of the matrix material is 1 or less, preferably 0.75 or less, more preferably 0.5 or less. In some situations, the control means and said matrix material comprise the same material, in which case the water vapour permeability through the respective materials may be substantially the same. In other situations, water vapour permeability of the control means may be such that the rate of passage of moisture through the control means, towards the hydrogen generating means, is faster than the rate of passage through the hydrogen generating means. Nonetheless in such situations the control means is still found to exercise control over hydrogen generation because the moisture "backs up" in the material of the control means; and it is found that the rate of hydrogen generation in the presence of such a control means is less than in the absence of such a control means.

In one embodiment, the ratio of the water vapour permeability (g·mm/m$^2$ day) of the control means divided by the water vapour permeability of the matrix material is 15 or less, 10 or less, 3 or less, or 2.6 or less. It may be in the range 0 to 15, 0 to 10 or 0 to 3.

In another embodiment, said control means comprises a material, for example a polymeric material, which has a water vapour permeability (g·mm/m$^2$·day) which is the same or less than the water vapour permeability of said matrix material (preferably a said polymeric matrix material present in the greatest amount if more than one polymeric matrix material is included in said matrix) of said hydrogen generating means. The ratio of the water vapour permeability of the material, for example polymeric material, of said control means to the water vapour permeability of a said matrix material (preferably a said polymeric matrix material present in the greatest amount if more than one polymeric matrix material is included in said matrix) of said hydrogen generating means may be 1 or less, preferably 0.75 or less, more preferably 0.5 or less.

Said control means may comprise a layer of material, for example polymeric material, having a water vapour permeability of less than 5.0 g·mm/m$^2$·day, suitably less than 4.0 g·mm/m$^2$·day, preferably less than 3.0 g·mm/m$^2$·day, more preferably less than 2.0 g·mm/m$^2$·day.

Said control means may comprise a layer (or layers) of polymeric material selected from HDPE, PP, LLDPE, LDPE, PS, PET, EVA, SEBS, Nylon (e.g. Nylon-6), thermoplastic elastomers (TPEs) and olefinic block copolymers (OBCs) and mixes of these and other polymers.

At least part of said control means is preferably provided in a first layer. A second layer may comprise said hydrogen generating means. Said second layer may abut and/or contact (e.g. make face to face contact with) the first layer. Where the control means includes more than one layer, part of the control means may be defined by said first layer and part defined by another layer.

In one preferred embodiment, a control means in said first layer may substantially fully encapsulate said hydrogen generating means provided in a second layer, for example as illustrated in FIG. 7 hereinafter.

Said second layer may incorporate hydrogen generating means which may comprise a matrix with which said active material is associated, for example embedded or preferably dispersed. Said matrix may comprise a matrix material, for example a polymeric matrix material, selected based on the solubility of moisture in the bulk polymer and which is suitably chemically inert to the active material. Suitable matrix materials have a water vapour permeability of greater than 0.1 g·mm/m$^2$·day, suitably greater than 0.2 g·mm/m$^2$·day, preferably greater than 0.4 g·mm/m$^2$·day, more preferably greater than 0.6 g·mm/m$^2$·day, and especially greater than 0.8 g·mm/m$^2$·day. In some cases, said water vapour permeability may be greater than 1.0 g·mm/m$^2$·day. Said matrix material may comprise a blend comprising, for example, at least two polymeric materials.

The water vapour permeability of said matrix material may be less than 5 g·mm/m$^2$·day, less than 4 g·mm/m$^2$·day or less than 3 g·mm/m$^2$·day. Suitable polymeric matrix materials include but are not limited to ethylene vinyl acetate, styrene-ethylene-butylene (SEBS) copolymers, Nylon 6, styrene, styrene-acrylate copolymers, polybutylene terephthalate, polyethylene and polypropylene.

Catalyst may be dispersed in said first layer or said second layer. The sum of the volume of the first and second layers is referred to as the "sum-vol", in mm$^3$. Said OSS may include less than 0.20 μg, suitably less than 0.15 μg, preferably less than 0.10 μg, more preferably less than 0.08 μg, especially less than 0.06 μg of catalyst per unit of said sum-vol in mm$^3$. In some cases, said first or second layers may include 0.00000050 g to 0.000040 g, preferably 0.0000010 g to 0.000020 g of catalyst. At least one of said first or second layers (preferably both the first and second layers) may include less than 100 ppm, less than 80 ppm or less than 60 ppm of said catalyst. In some cases, at least one of said first or second layers (preferably both of said first and second layers) may include less than 50 ppm, suitably less than 45 ppm, preferably less than 35 ppm, more preferably less than 30 ppm, especially less than 25 ppm of said catalyst. At least one of said first or second layers may include at least 5 ppm, at least 10 ppm, at least 12 ppm or at least 15 ppm of said catalyst.

The maximum thickness of said first layer is suitably less than 5 mm, preferably less than 4 mm, more preferably less than 3 mm. The minimum thickness of said first layer is suitably at least 0.1 mm, preferably at least 0.2 mm. Said first layer may have different thicknesses across its extent. Suitably, at least 50%, preferably at least 60% of the area of said first layer, which may face in the direction of the contents of a container body in use, has a thickness measured perpendicular to a main plane or area thereof in the range 0.1 to 1.5 mm, suitably 0.1 to 1.0 mm, preferably 0.15 to 0.50 mm.

Said first and second layers together suitably include less than 50 ppm of catalyst (i.e. calculated based on the total weight of catalyst dispersed in the total weight defined by said first and second layer). Said first and second layers together suitably include less than 45 ppm, preferably less than 35 ppm, more preferably less than 30 ppm, especially less than 25 ppm of catalyst. Said first and second layers together may include at least 5 ppm, at least 10 ppm, at least 12 ppm or at least 15 ppm of said catalyst.

Said first layer preferably includes at least some of said catalyst. Said first layer suitably includes at least 50 wt %, preferably at least 70 wt %, especially at least 90 wt % of the total amount of catalyst in said OSS.

Said second layer may have a maximum thickness of less than 3 mm or less than 2 mm. The minimum thickness of said second layer may be at least 0.1 mm, at least 0.2 mm, at least 0.5 mm or at least 0.8 mm. Said second layer may have different thicknesses across its extent. Suitably, at least 50%, preferably at least 60% of the area of said second layer which faces in the direction of the interior of the container body in use has a thickness measured perpendicular to a main plane or area of the second layer in the range 0.1 to 2 mm, for example 0.2 to 2 mm.

Said OSS suitably includes a catalyst-containing structure which preferably includes three or fewer layers. It preferably includes the first and second layers described. It preferably includes only two layers—i.e. only the first and second layers described.

Said OSS may be arranged to be secured to a container body by heat sealing, glueing or welding.

Said catalyst-containing structure suitably has a surface area which is exposed to the inside of a container body, in use. Said surface area may be less than 5000 mm$^2$, less than 4000 mm$^2$ or less than 3000 mm$^2$. It may be less than 1500 mm$^2$, suitably less than 1200 mm$^2$, more preferably less than 900 mm$^2$. In some cases, the surface area may be less than 800 mm$^2$ or less than 700 mm$^2$. The surface area is suitably greater than 150 mm$^2$, preferably greater than 300 mm$^2$, more preferably greater than 400 mm$^2$.

The maximum thickness of said catalyst-containing structure, measured in a direction which is perpendicular to the maximum dimension (e.g. diameter) of the structure, is suitably less than 4 mm, preferably less than 3 mm, more preferably less than 2.5 mm. The minimum thickness measured as aforesaid may be at least 0.10 mm, suitably at least 0.20 mm.

Said catalyst-containing structure may have a volume of less than 10000 mm$^3$, less than 8000 mm$^3$ or less than 6000 mm$^3$. In some cases, it may be less than 4000 mm$^3$ or less than 2000 mm$^3$. It may have a volume of at least 100 mm$^3$ or at least 150 mm$^3$.

When the material or materials within which the catalyst is dispersed occupy a first volume as described above, said catalyst-containing structure suitably incorporates said first volume.

When said OSS includes a first layer and/or a second layer as described, said catalyst-containing structure suitably incorporates said first and second layers. In some embodiments, an additional layer or layers may be provided between said first and second layer, wherein said additional layer(s) may act as tie layers.

When said catalyst-containing structure includes first and second layers as described, said first layer may be closer to the contents of the container body in use, than said second layer. Said first layer may overlie said second layer. Said second layer may be encapsulated, at least in part by said first layer. Said second layer is preferably not exposed to the inside of a container body in use.

Said second layer may be positioned between a wall of a container and said first layer. Said second layer is preferably wholly encapsulated; it may be separated from the contents of the container body in use by said first layer.

Said catalyst is selected to catalyse the reaction between molecular hydrogen and molecular oxygen, to produce water. A large number of catalysts are known to catalyze the reaction of hydrogen with oxygen, including many transition metals, metal borides (such as nickel boride), metal carbides (such as titanium carbide), metal nitrides (such as titanium nitride), and transition metal salts and complexes. Of these, Group VIII metals are particularly efficacious. Of the Group VIII metals, palladium and platinum are especially preferred because of their low toxicity and extreme efficiency in catalyzing the conversion of hydrogen and oxygen to water with little or no byproduct formation. The catalyst is preferably a redox catalyst.

Unless otherwise stated, the amounts (e.g. ppm, wt %, etc.) of catalyst referred to herein are the amounts of active species, for example metal, which are able to catalyse the reaction between molecular hydrogen and molecular oxygen, excluding any coordinated groups. Thus, when palladium acetate is used to deliver palladium, the ppm, wt %, etc. referred to herein refer to the ppm or wt % etc., of palladium delivered, excluding the acetate moieties.

Said catalyst is preferably a metal, preferably a transition metal, preferably selected from palladium and platinum, with palladium being especially preferred.

Suitably, references to catalyst for catalysing a reaction between hydrogen and oxygen refer to all such catalysts, even if different types of such catalyst are included in said closure. However, preferably said closure includes a single type of catalyst.

When the hydrogen generating means includes a matrix material with which said active material is associated, the ratio of the weight of active material to matrix material may be at least 0.01, preferably at least 0.02. Preferably, the matrix comprises a polymeric matrix and said active material is dispersed therein. In general, once an active material is dispersed into a polymer, the rate of release of hydrogen is limited by the permeation rate of water into the polymeric matrix and/or by the solubility of water in the chosen matrix. Thus, selection of polymeric materials based on the permeability or solubility of water in the polymer allows one to control the rate of release of molecular hydrogen from active materials. However, by selection of appropriate control means, the rate determining step for release of hydrogen may be determined by properties of said control means, as described herein.

The matrix may include at least 1 wt % of active material, preferably at least 2 wt %. The matrix may include less than 70 wt % of active material. Suitably, the matrix includes 1-60 wt %, preferably 2-40 wt % of active material, more preferably 4-30 wt % of active material. The balance of material in the matrix may predominantly comprise a said polymeric material. It may include other additives, for example fillers (e.g. oils) and materials to make the appearance of the matrix appear more visually uniform.

Said active material may comprise a metal and/or a hydride. A said metal may be selected from sodium, lithium, potassium, magnesium, zinc or aluminum. A hydride may be inorganic, for example it may comprise a metal hydride or borohydride; or it may be organic.

Active materials suitable for the release of molecular hydrogen as a result of contact with water include but are not limited to: sodium metal, lithium metal, potassium metal, calcium metal, sodium hydride, lithium hydride, potassium hydride, calcium hydride, magnesium hydride, sodium borohydride, and lithium borohydride. While in a free state, all of these substances react very rapidly with water; however, once embedded into a polymeric matrix, the rate of reaction proceeds with a half-life measured in weeks to months, for example when stored at ambient temperature.

Other active substances may include organic hydrides such as tetramethyl disiloxane and trimethyl tin hydride, as well as metals such as magnesium, zinc, or aluminum. Where the rate of reaction between the active material and water is too slow, the addition of hydrolysis catalysts and/or agents are explicitly contemplated. For example, the rate of hydrolysis of silicon hydrides may be enhanced by the use of hydroxide or fluoride ions, transition metal salts, or noble metal catalysts.

It is also contemplated that the active material may also be the polymeric matrix. For example, polymeric silicon hydrides such as poly(methylhydro)siloxane provide both a polymeric matrix and an active substance capable of releasing molecular hydrogen when in contact with moisture.

Selection of suitable active substances for incorporation into a polymeric matrix can be based on a number of criteria, including but not limited to cost per kilogram, grams of $H_2$ generated per gram of active substance, thermal and oxidative stability of the active substance, perceived toxicity of the material and its reaction byproducts, and ease of handling prior to incorporation into a polymeric matrix. Of the suitable active substances, hydrides are preferred; sodium borohydride is exemplary because it is commercially available, thermally stable, of relatively low cost, has a low equivalent molecular weight, and produces innocuous byproducts (sodium metaborate).

The hydrogen generating means, suitably in the form of a hydride, is preferably provided in a said second layer as described and, suitably, the ratio of the weight of hydrogen generating means (e.g. hydride compound) divided by the weight of polymeric matrix, is in the range 0.02 to 0.25, preferably in the range 0.06 to 0.12.

The ratio of the weight of hydrogen generating means (e.g. hydride compound) divided by the weight of catalyst (e.g. palladium) in said OSS is preferably in the range 50-20000, more preferably in the range 800-15000, especially in the range 2000-12000.

In a preferred embodiment, said OSS comprises, preferably consists essentially of, a closure for a container body, the closure comprising:

a hydrogen generating means which includes active material arranged to generate molecular hydrogen on reaction with moisture; and catalyst for catalysing a reaction between hydrogen and oxygen.

Said closure preferably includes a first closure area which is the area defined within a perimeter of the closure which perimeter extends around an opening in a container body in use, to close the opening. Said closure may include less than 0.10 μg (e.g. less than 0.08 μg or less than 0.06 μg) of catalyst per unit area in (mm$^2$) of said first closure area. The closure may include at least 0.01 μg, for example at least 0.02 μg of catalyst per unit area (in mm$^2$) of said first closure area.

Said closure preferably includes an endless seal means which is arranged to engage a container body for sealing the closure to the container body. A second closure area is defined by an innermost perimeter of the endless seal means. For example, in the specific embodiments which follow, the closure area is the area within the sealing well 46.

Said closure may include less than 0.10 μg (e.g. less than 0.08 μg or less than 0.06 μg) of catalyst per unit area (in mm$^2$) of said second closure area. The closure may include at least 0.01 μg, for example at least 0.02 μg of catalyst per unit area (in mm$^2$) of said second closure area.

Said closure may include less than 0.000200 g, preferably less than 0.000150 g, more preferably less than 0.000100 g of catalyst.

In some embodiments, for example where the closure has a diameter of about 38 mm, said closure may include less than 0.000040 g, suitably less than 0.000035 g, preferably less than 0.000030 g, more preferably less than 0.000025 g, especially less than 0.000020 g of catalyst. In some cases, the closure may include less than 0.000015 g, less than 0.000010 g or even less than 0.000008 g of catalyst. Said closure may include at least 0.00000050 g or at least 0.0000010 g of catalyst.

Said closure may include less than 10 ppm, suitably less than 8 ppm, preferably less than 6 ppm, more preferably less than 5 ppm of catalyst, based on the total weight of said closure. Said closure may include at least 1 ppm of catalyst.

The closures as described may be of different sizes (e.g. diameters) and thereby arranged to be secured to container bodies of different sizes to sealingly close openings in such container bodies. For example, a wide mouth container (e.g. wide mouth jar) may utilise a closure of diameter 60-90 mm, a common one being 63 mm; a first type of bottle may have a closure of about 38 mm; and a second bottle type may have a closure of about 28 mm.

Said catalyst is preferably dispersed within one or more (e.g. two) materials which are associated with, for example integral parts of said closure. The material or materials within which the catalyst is dispersed preferably occupy a first volume within the closure. (This may be the total volume defined by the layers 50 and/or 52 in the specific embodiments which follow). The first volume may be less than 15000 mm$^3$, suitably less than 10,000 mm$^3$. The aforementioned may apply to said wide mouth containers, for example if the thickness of the material(s) in which the catalyst is dispersed is 3 mm thick. Closures for wide mouth containers may in some cases have a first volume of less than 8000 mm$^3$; less than 7000 mm$^3$ or less than 6000 mm$^3$, for example if the thickness of the material(s) in which the catalyst is dispersed is 2 mm thick. Closures for wide mouth containers may have a first volume of less than 5000 mm$^3$, or less than 4000 mm$^3$, for example wherein the thickness of the material(s) in which the catalyst is dispersed is 1 mm thick. In some cases, for example, for said first type of bottle, said first volume may be less than 1500 mm$^3$, suitably less than 1200 mm$^3$, preferably less than 1000 mm$^3$. For said second type of bottle, for example, said first volume may be less than 1000 mm$^3$, for example if the thickness of the material(s) in which the catalyst is dispersed is 3 mm thick. The first volume may be less than 800 mm$^3$ or less than 700 mm$^3$, for example of the thickness of the material(s) in which the catalyst is dispersed is 2 mm thick; or may be less than 500 mm$^3$ or less than 400 mm$^3$, where said thickness is 1 mm. The first volume may be at least 100 mm³, or at least 150 mm³ or at least 200 mm³.

Where the OSS comprises a closure, the catalyst volume-area ratio (CVR) is defined as follows:

$$CVR(\text{in mm}) = \frac{\text{total volume of material(s) in which catalyst is dispersed(e.g. said first volume)}}{\text{the area of a face of said first volume which has the greatest area}}$$

The area of said face preferably has a substantially circular perimeter. Said area may be annular or circular.

Said CVR for said closure is suitably in the range 0.2 to 1.5, suitably 0.8 to 1.5, preferably 0.8 to 1.2, more preferably 0.9 to 1.1.

For said closure, the material or materials in which the catalyst is dispersed (e.g. said first volume) may include at least 0.05 µg, suitably at least 0.010 µg, preferably at least 0.015 µg of catalyst per unit volume (in mm³) of said material or materials. Where the catalyst is dispersed in two (or more) different materials the µg per unit volume values suitably refer to the total catalyst in the two (or more) layers divided by the total volume (in mm³) occupied by the layers. Said material or materials in which the catalyst is dispersed may include less than 0.20 µg, suitably less than 0.15 µg, preferably less than 0.10 µg, more preferably less than 0.08 µg, especially less than 0.06 µg of catalyst per unit volume (in mm³).

Said first volume may include 0.00000050 g to 0.000160 g, suitably 0.00000050 g to 0.00010 g of catalyst. In some cases, said first volume may include 0.00000050 g to 0.000040 g, for example 0.0000010 g to 0.000020 g of catalyst.

Said hydrogen generating means of said closure suitably includes a matrix material with which said active material is associated, as described for said OSS.

Said closure preferably includes a control means for controlling the passage of moisture, for example water vapour (e.g. from material held in use in a container body) to said active material arranged to generate molecular hydrogen, as described for said OSS.

At least part of said control means of said closure is preferably provided in a first layer, and a second layer may comprise said hydrogen generating means, as described for said OSS.

Catalyst may be dispersed in said first layer or said second layer. At least some catalyst is preferably provided in said first layer. The sum of the volume of the first and second layers is referred to as the "sum-vol", in mm³. Said closure may include less than 0.20 µg, suitably less than 0.15 µg, preferably less than 0.10 µg, more preferably less than 0.08 µg, especially less than 0.06 µg of catalyst per unit of said sum-vol in mm³. In some cases, for example where the closure has a diameter of about 38 mm, at least one of said first or second layers (preferably said first layer) may include 0.00000050 g to 0.000040 g, preferably 0.0000010 g to 0.000020 g of catalyst. At least one of said first or second layers (preferably both the first and second layers) may include less than 100 ppm, less than 80 ppm or less than 60 ppm of said catalyst. In some cases, at least one of said first or second layers (preferably both of said first and second layers) may include less than 50 ppm, suitably less than 45 ppm, preferably less than 35 ppm, more preferably less than 30 ppm, especially less than 25 ppm of said catalyst. At least one of said first or second layers (preferably said first layer) may include at least 5 ppm, at least 10 ppm, at least 12 ppm or at least 15 ppm of said catalyst.

The maximum thickness of said first layer of said closure is suitably less than 5 mm, preferably less than 4 mm, more preferably less than 3 mm. The minimum thickness of said first layer is suitably at least 0.1 mm, preferably at least 0.2 mm. Said first layer may have different thicknesses across its extent. Suitably, at least 50%, preferably at least 60% of the area of said first layer which faces in the direction of the container body in use has a thickness measured perpendicular to a main plane or area thereof in the range 0.1 to 1.5 mm, suitably 0.1 to 1.0 mm, preferably 0.15 to 0.50 mm.

Said first and second layers of said closure together suitably include less than 50 ppm of catalyst (i.e. calculated based on the total weight of catalyst dispersed in the total weight defined by said first and second layer). Said first and second layers together suitably include less than 45 ppm, preferably less than 35 ppm, more preferably less than 30 ppm, especially less than 25 ppm of catalyst. Said first and second layers together may include at least 5 ppm, at least 10 ppm, at least 12 ppm or at least 15 ppm of said catalyst.

Said second layer may have a maximum thickness of less than 3 mm or less than 2 mm. The minimum thickness of said second layer may be at least 0.1 mm, at least 0.2 mm, at least 0.5 mm or at least 0.8 mm. Said second layer may have different thicknesses across its extent. Suitably, at least 50%, preferably at least 60% of the area of said second layer which faces in the direction of the interior of the container body in use has a thickness measured perpendicular to a main plane or area of the second layer in the range 0.1 to 2 mm, for example 0.2 to 2 mm.

Said container suitably includes a catalyst-containing structure which is suitably fixed (preferably substantially permanently fixed) in position relative to a closure body, for example a closure shell referred to in the specific embodiments which follow. Said catalyst-containing structure preferably includes three or fewer layers. It preferably includes the first and second layers described. It preferably includes only two layers—i.e. only the first and second layers described. Said closure body is suitably arranged to overlie an opening in a container body. The closure body suitably includes means for securing, preferably releasably securing, the closure on a container body. Said means for securing may comprise a screw-threaded area suitably associated with an inwardly facing wall of the closure body. Said means for securing may be arranged to cooperate with a corresponding region on an outside wall of a neck of a container body.

The closure body suitably includes a top wall which is suitably circular in cross-section (although it may have another shape, such as a hexagonal shape) and is suitably arranged to be superimposed and/or overlie in use an opening in a container body with which the closure may cooperate. The closure body preferably includes a skirt (suitably having a circular cross-section) depending from the top wall, wherein preferably an inwardly facing wall of the skirt includes the aforementioned means for securing. Preferably, said means for securing, for example said screw-threaded area, extends from a free edge of the skirt towards the top wall. Preferably said closure body including said skirt and said means for securing define a unitary member. Said closure body may be produced in a moulding process, for example an injection moulding or compression moulding process, using a polymeric material such as a polyolefin.

The closure body suitably defines a cap arranged to be secured, preferably releasably secured, to a container body.

Whilst in some embodiments, the closure is a cap, for example for a container such as a bottle, the invention described may be applied to other closure types for example closures which are not releasably securable—e.g. they are single use closures and may comprise laminates and/or lidding foils, sheets or patches. Such closures may be arranged to be secured to a tray, cup or other receptacle and are removable, wholly or in part, to provide access to the contents of the receptacle in use. The receptacle may be made from CPET. Such closures may include first and second layers as described herein mutatis mutandis. They may include an additional relatively impermeable layer over the second layer and/or being arranged to define an outermost layer of the closure in use, suitably to limit and prevent passage of oxygen into the container via the closure. In the "cap" embodiment described, the closure body, for example the shell, fulfils this function.

In one embodiment, for example where the closure is for a container which contains, in use, a sauce (or other product which is dispensed intermittently after initial opening over a period of months), a closure may comprise a laminate comprising first and second layers as described. Such a closure may be arranged to be removed and discarded after initial opening; and it may be replaced by a further closure which may be as described herein.

Closures which comprise laminates or lidding foils (and which may not be arranged to be releasably securable to a container body), may be arranged to be secured to a container body by heat sealing, glueing or welding.

Said catalyst-containing structure suitably has a surface area which is exposed to the inside of a container body, in use, when the closure is attached to a container body. Said surface area may be less than 7000 mm$^2$, suitably less than 1500 mm$^2$, preferably less than 1200 mm$^2$, more preferably less than 900 mm$^2$. In some cases, the surface area may be less than 800 mm$^2$ or less than 700 mm$^2$. The surface area is suitably greater than 150 mm$^2$, preferably greater than 300 mm$^2$, more preferably greater than 400 mm$^2$.

The maximum thickness of said catalyst-containing structure, measured in a direction which is perpendicular to the maximum dimension (e.g. diameter) of the structure, is suitably less than 4 mm, preferably less than 3 mm, more preferably less than 2.5 mm. The minimum thickness measured as aforesaid may be at least 0.10 mm, suitably at least 0.20 mm.

Said catalyst-containing structure may have a volume of less than 10000 mm$^3$, less than 8000 mm$^3$ or less than 6000 mm$^3$. In some cases, it may be less than 4000 mm$^3$ or less than 2000 mm$^3$. It may have a volume of at least 100 mm$^3$ or at least 150 mm$^3$.

When the material or materials within which the catalyst is dispersed occupy a first volume as described above, said catalyst-containing structure suitably incorporates said first volume.

When said closure includes a first layer and/or a second layer as described, said catalyst-containing structure suitably incorporates said first and second layers. In some embodiments, an additional layer or layers may be provided between said first and second layer, wherein said additional layer(s) may act as tie layers.

When said catalyst-containing structure includes first and second layers as described, said first layer may be closer to the contents of the container body in use, than said second layer. Said first layer may overlie said second layer. Said second layer may be encapsulated, at least in part by said first layer.

Said second layer may be positioned between a closure body and said first layer. Said second layer is preferably wholly encapsulated; it may be separated from the contents of the container body in use by said first layer.

In said closure, the hydrogen generating means, suitably in the form of a hydride, is preferably provided in a said second layer as described and, suitably, the ratio of the weight of hydrogen generating means (e.g. hydride compound) divided by the weight of polymeric matrix, is in the range 0.02 to 0.25, preferably in the range 0.06 to 0.12.

The ratio of the weight of hydrogen generating means (e.g. hydride compound) divided by the weight of catalyst (e.g. palladium) in said closure is preferably in the range 50-20000, more preferably in the range 800-15000, especially in the range 2000-12000.

According to a second aspect of the invention, there is provided a container which comprises an oxygen scavenging structure (OSS), for example a closure, according to the first aspect associated with a container body. The OSS may be secured relative to the container body. Where the OSS is a closure, it may be secured to the container body.

When said OSS is a closure, said second layer (which includes said active material) is preferably encapsulated and/or is not exposed to the inside of the container body. It is suitably encapsulated between a part of a closure shell of the closure and said first layer.

Said container body may be either of a monolayer or a multilayer construction. In a multi-layered construction, optionally one or more of the layers may be a barrier layer. A non-limiting example of materials which may be included in the composition of the barrier layer are polyethylene co-vinyl alcohols (EVOH), poly(glycolic acid), and poly (metaxylylenediamine adipamide). Other suitable materials which may be used as a layer or part of one or more layers in either monolayer or multilayer container bodies include polyester (including but not limited to PET), poly(lactic) acid, polyetheresters, polyesteramides, polyurethanes, polyimides, polyureas, polyamideimides, polyphenyleneoxide, phenoxy resins, epoxy resins, polyolefins (including but not limited to polypropylene and polyethylene), polyacrylates, polystyrene, polyvinyls (including but not limited to poly (vinyl chloride)) and combinations thereof. Furthermore glassy interior and/or exterior coatings ($SiO_x$ and/or amorphous carbon) are explicitly contemplated as barrier layers. All of the aforementioned polymers may be in any desired combination thereof.

In preferred embodiment, the container body includes walls defined by a polymer suitable for use in the type of packaging being formed, for example, because of its cost, physical properties and/or organoleptic properties.

In another preferred embodiment, the container body includes walls defined by a polyolefin layer (or layers), for example, of polypropylene or polyethylene.

In a more preferred embodiment, the container body includes walls defined by polyester, for example PET.

The shape, construction, or application of a container body is not critical. In general, there is no limit to the size or shape of the container body. For example, the container body may be smaller than 1 milliliter or greater than 1000 liter capacity. The container body preferably has a volume in the range 20 ml to 100 liter, more preferably 100 ml to 5 liter. In an especially preferred embodiment, the container body has a volume of 0.25 to 2.5 liters, especially 0.3 to 1 liters. A container body may be of sachet, bottle, jar, bag, pouch, pail, tub, barrel, or other like containers.

Said container body may include a permeable wall comprising of one or more polymers that have in the absence of any oxygen scavenging a permeability between about $6.5 \times 10^{-7}$ cm$^3$-cm/(m$^2$-atm-day) and about $1 \times 10^4$ cm$^3$-cm/(m$^2$-atm-day).

Said container body suitably includes no palladium catalyst for catalysing a reaction between hydrogen and oxygen and preferably includes no catalyst added for catalysing a reaction between hydrogen and oxygen.

The container may contain a product, for example a consumable, such as a food or beverage. The product may be relatively oxygen sensitive. The amount of oxygen that a product, for example food, can tolerate before it is out of specification with respect to taste, colour, odour etc. is given by an oxygen specification in w/v ppm, wherein the following foods have oxygen specifications in w/v ppm as indicated in brackets: beer (1-3), low acid foods (1-3), fine wine (2-5), coffee (2-5), tomato-based products (3-8), high acid fruit juices (8-20), carbonated soft drinks (10-40), oil and shortening (20-50), salad dressing (30-100), peanut butter (30-100), liquor (50-100+), jams and jellies (50-100+).

A container as described is surprisingly effective even in relation to foods which are very oxygen sensitive. Thus, said container may include a product having an oxygen specification of 20 or less. Said product may be selected from wine, tea, fruit juices, vitamin enhanced water, sauces (e.g. apple) and tomato based drinks and foods. Said container may contain a vitamin C-containing product, for example which contains at least 10 mg/l, suitably at least 25 mg/l, preferably at least 50 mg/l, more preferably at least 100 mg/l, especially at least 200 mg/l of vitamin C. The level of vitamin C may be less than 700 mg/l vitamin C.

The ratio of the weight (in g) of catalyst in said container body to the weight (in g) of catalyst in said OSS, for example said closure, is less than 0.10, suitably less than 0.05, preferably less than 0.01. As aforementioned, said container body suitably includes no catalyst added for catalysing a reaction between hydrogen and oxygen.

Said container body has an internal volume for containing products. Said OSS, for example said closure, may include less than 0.001 µg (preferably less than 0.0005 µg, more preferably less than 0.00001 µg) of catalyst per unit (internal) volume (in mm$^3$) of the container body.

According to a third aspect of the invention, there is provided an insert for a container or part thereof, said insert comprising hydrogen generating means which includes active material arranged to generate molecular hydrogen on reaction with moisture, where said hydrogen generating means is fully enclosed in a material which preferably does not include hydrogen generating means and wherein said insert includes catalyst for catalysing a reaction between hydrogen and oxygen.

Said hydrogen generating means may be as described according to the first aspect. Said hydrogen generating means is preferably provided in a second layer as described according to the first aspect.

Said material which fully encloses said hydrogen generating means preferably defines a said control means as described according to the first aspect. Said material which fully encloses said hydrogen generating means may be defined by a said first layer as described according to said first aspect.

Said catalyst is preferably dispersed within one or more (e.g. two) materials which define said insert and said material(s) suitably occupy a first volume which may have any feature of the first volume of the first aspect.

Said insert preferably includes a said catalyst-containing structure as described according to said first aspect, wherein suitably said structure includes said first and second layers described.

The maximum thickness of the layer which encloses the hydrogen generating means may be as described according to the first aspect for that of said first layer.

The maximum thickness of the layer which includes said hydrogen generating means may be as described according to the first aspect for that of said second layer.

The ratio of the thickness of said first layer divided by the thickness of the second layer (the thicknesses being assessed on a cross-section of the insert taken through a centre of the insert perpendicular to the main plane of the insert) is suitably in the range 0.1 to 4, preferably 0.1 to 2, more preferably 0.1 to 1, especially 0.2 to 0.5. Note, for the avoidance of doubt, the thickness referred to is that of one layer of said material which encloses said part of the material which full encloses the hydrogen generating means, it being appreciated that the cross-section referred to will include layers on opposite sides of said hydrogen generating means.

Said insert may be for a closure of a container or may be for a container body.

According to a fourth aspect, there is provided a container or part thereof which includes an insert of the third aspect. Said insert may be secured to the container or part thereof. For example, it may be moulded to said container or part thereof or may be adhered for example glued, heat sealed or welded to said part. In one embodiment, the insert may be arranged within the container but not fixed—e.g. it may be freely moveable such as free-floating within the container. In one embodiment, the insert may be adhered to a closure body (e.g. a closure shell).

According to a fifth aspect of the invention, there is provided a method of making an oxygen scavenging structure (OSS), for example a closure according to the first aspect, the method comprising:

(a) selecting a first material which includes active material arranged to generate molecular hydrogen on reaction with moisture;

(b) associating the selected material with other material or materials to define the OSS, for example closure.

In one embodiment, the method may include securing, for example adhering an insert of the third aspect to other materials, for example a closure body or to a film which may define an impermeable layer which may define an outermost layer of a closure in use. In another embodiment, in step (b), the selected material may be moulded with another material or materials to define the OSS, for example a closure. The first material selected in step (a) preferably includes matrix material and active material as described according to the first aspect and optionally includes a catalyst as described according to the first aspect. The first material is suitably arranged to define the second layer described according to the first aspect. The method preferably comprises selecting a second material arranged to define the control means and/or first layer of the first aspect, which may optionally include a catalyst as described according to the first aspect. Preferably, at least one of either the first material or the second material includes a catalyst for catalysing a reaction between hydrogen and oxygen as described.

In one embodiment, the method may include moulding, for example injection moulding, the first and second materials to define a structure in which the first and second materials are contiguous. The second material may be moulded at least partially around the first material. The method may include selecting a third material arranged to define a closure body (or closure shell). The method may comprise moulding the first, second and third materials so the third material defines a closure body, in which the first and second materials are arranged, with the closure body and second material encapsulating the first material.

According to a sixth aspect of the invention, there is provided a method of manufacturing a container comprising: associating, for example securing an oxygen scavenging structure (OSS), for example a closure, of the first aspect relative to a container body. The method preferably includes introducing a product as described in the second aspect into the container.

The invention extends to a method of protecting an oxygen sensitive consumable against deterioration as a result of contact with oxygen, the method comprising packing the consumable in a container which includes an OSS and/or a closure as described in any preceding aspect.

Any feature of any aspect of any invention or embodiment described herein may be combined with any feature of any aspect of any other invention described herein mutatis mutandis.

Specific embodiments of the invention will now be described, by way of example, with reference to the accompanying figures, in which.

Figure 1:
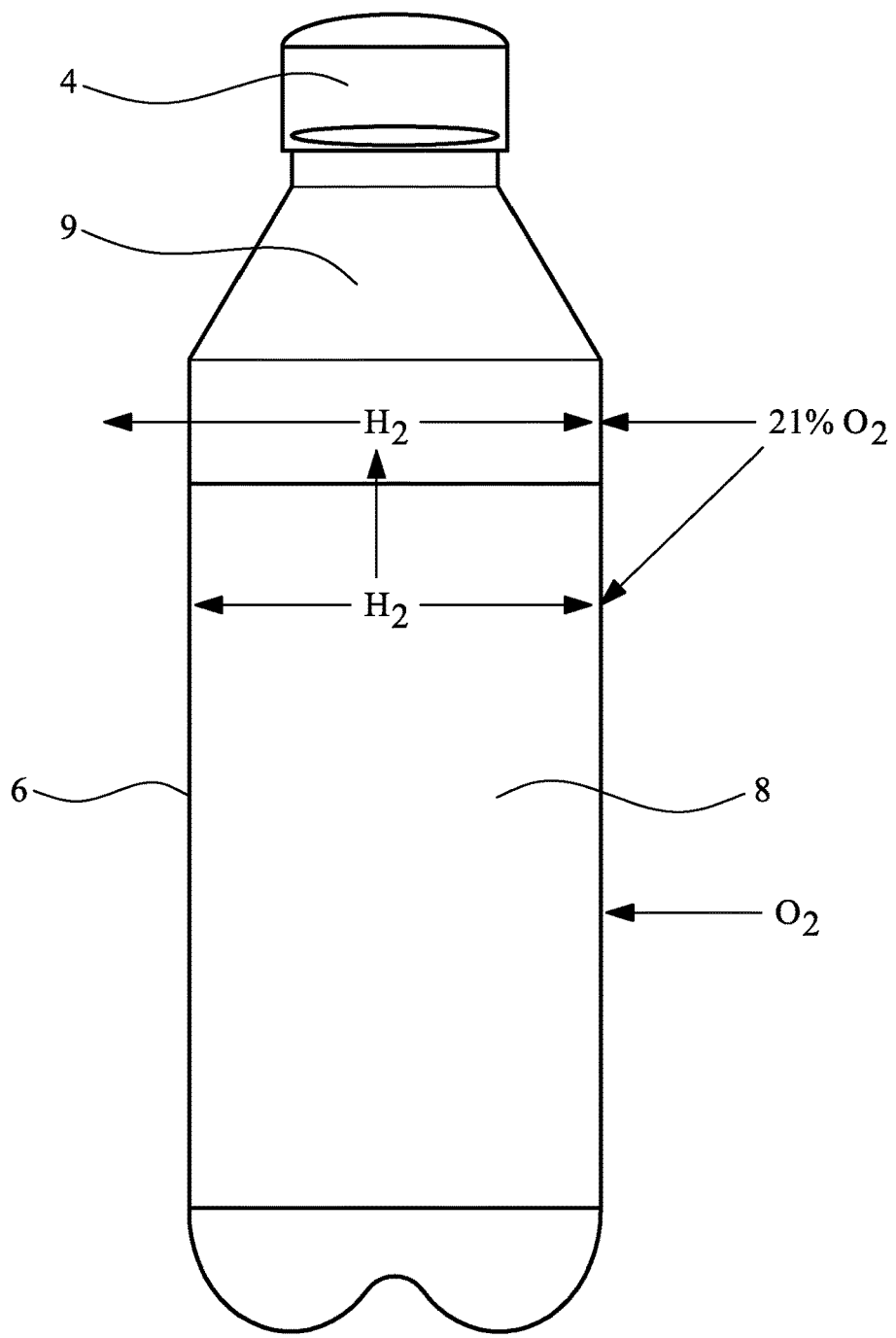
FIG. 1 is a schematic representation of a juice bottle incorporating oxygen scavenging technology.

The following materials are referred to hereinafter:

HyCat-1 (product code 280-10120-1)—a 0.42 wt % dispersion of palladium acetate in an inert carrier. available from Colormatrix;

HyCat Base-1 (product code 280-10119-1)—a 1 wt % dispersion of palladium acetate in an inert carrier available from Colormatrix;

Ti818—refers to a grade of PET resin, obtained from Wellman Inc. It is a PET-resin which does not contain any antimony;

EVA—ethylvinylacetate copolymer (Elvax 760 from DuPont) with vinyl acetate content of 9.3% and a melt flow index (190° C./2.16 kg)) of 2.0 g/10 min (ASTM D1238) was used as received;

EVA—ethylvinylacetate copolymer (Elvax 550 from DuPont) with vinyl acetate content of 15% and a melt flow index (190° C./2.16 kg)) of 8.0 g/10 min (ASTM D1238) was used as received;

HDPE—High density polyethylene (Rigidex HD5211EA from) Ineos was used as received;

Sodium Borohydride (Venpure SF) from Dow was used as received;

Flow—refers to a grade of PET resin, obtained from La Seda de Barcelona.

In the figures, the same or similar parts are annotated with the same reference numerals.

Figures 2, 3:
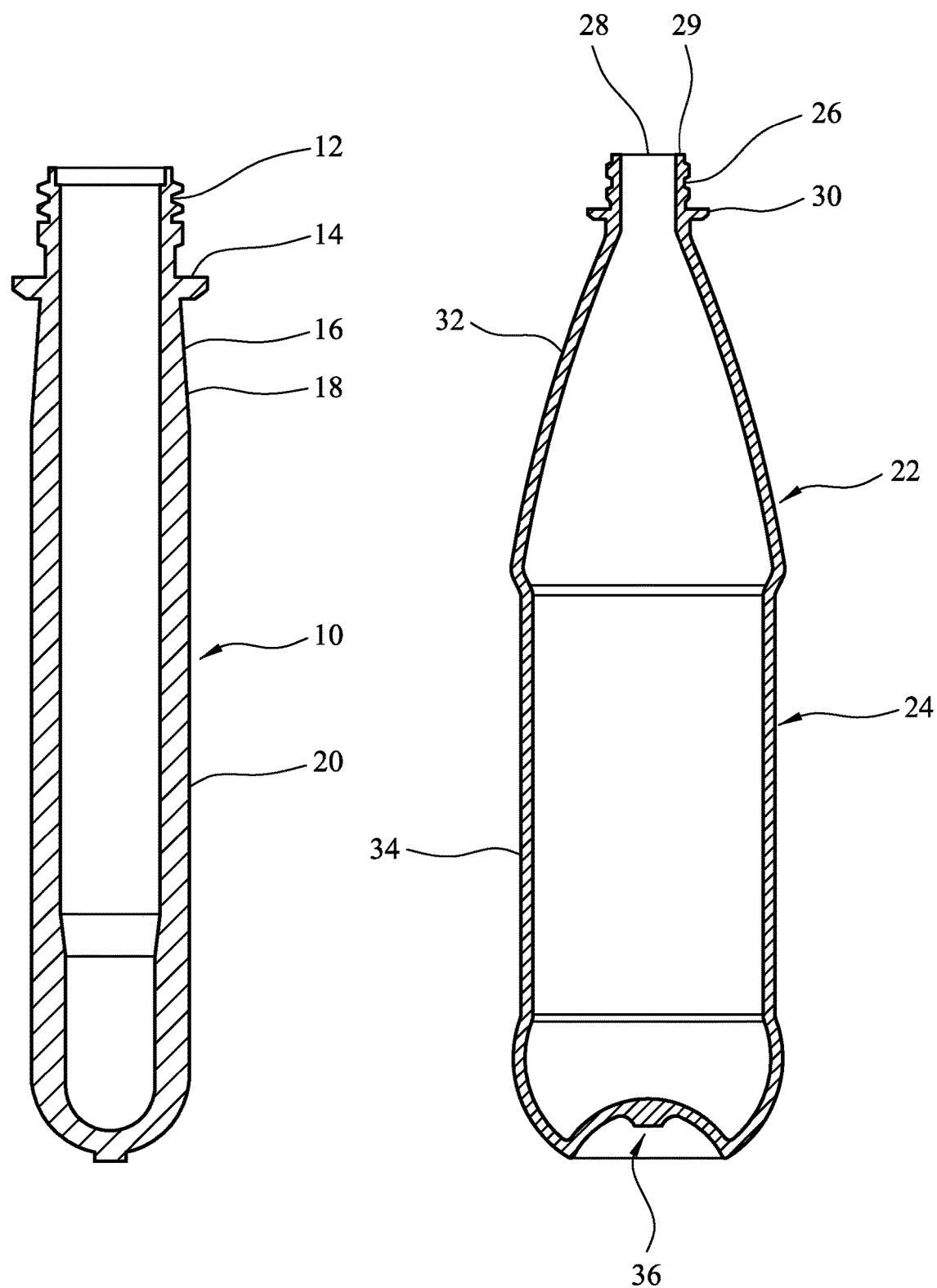
FIG. 2 is a cross-section through a preform.
FIG. 3 is a cross-section through a bottle.
Figure 4:
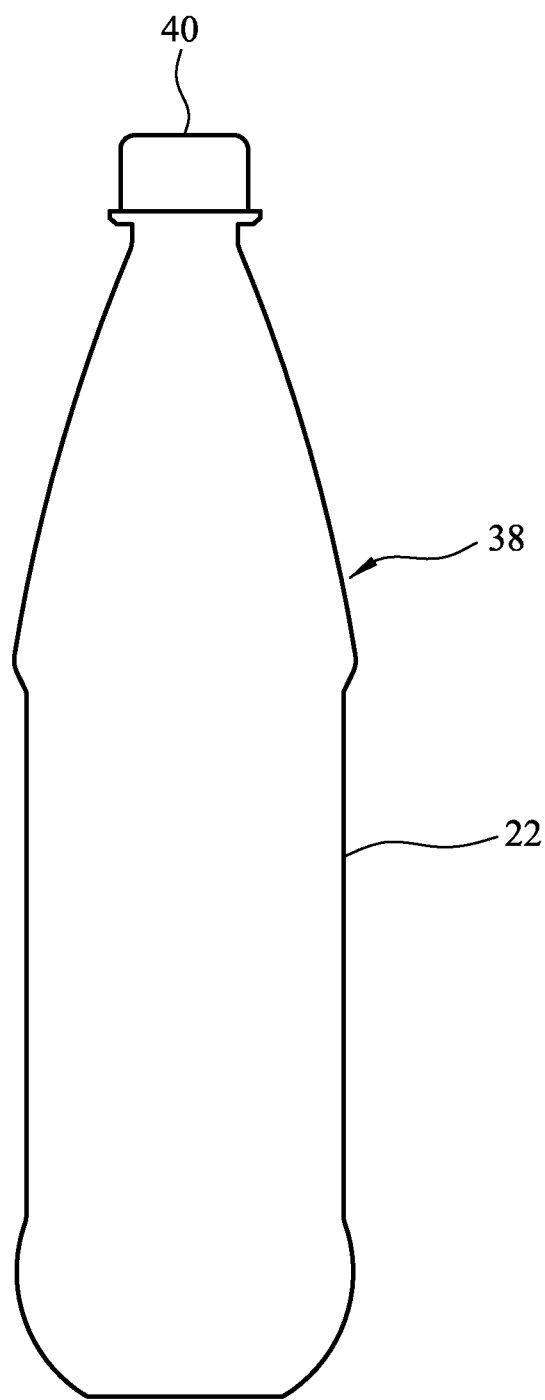
FIG. 4 is a side elevation of a bottle including a closure.

A preform 10 illustrated in FIG. 2 can be blow molded to form a container 22 illustrated in FIG. 3. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The container 22 is suitably used to make a packaged beverage 38, as illustrated in FIG. 4. The packaged beverage 38 includes a beverage. In one particular embodiment, the beverage is an oxygen sensitive beverage. It may be a vitamin C containing beverage such as a vitamin C containing fruit juice, a beverage which has been fortified with vitamin C, or a combination of juices in which at least one of the juices includes vitamin C. The beverage is disposed in the container 22 and a closure 40 seals the mouth 28 of container 22.

Figure 5:
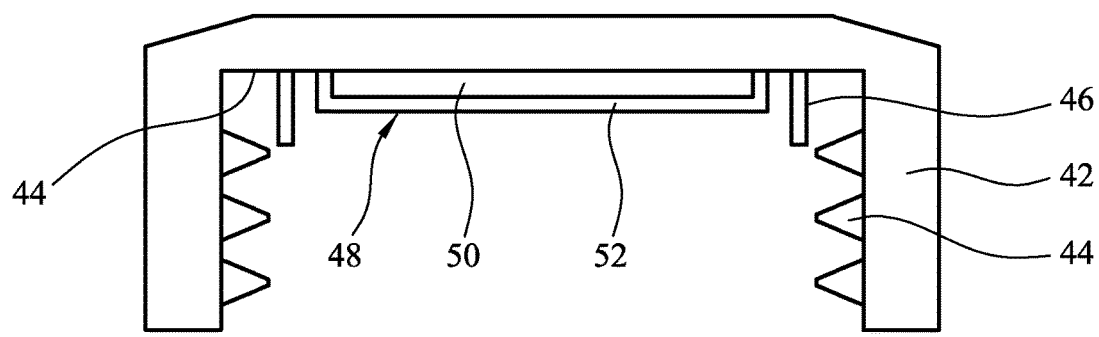
FIG. 5 is a closure, partly in cross-section.

Referring to FIG. 5, a circular cross-section aseptic closure 40 is shown which includes a closure shell 42 with a screw-threaded portion 44 for screw-threadedly engaging the closure with a threaded neck finish 26. Within the diameter of a sealing well 46 is a disc-shaped insert 48 which is moulded to inwardly facing wall 49 of shell 42. The insert 48 may include an inner layer 50 and an outer layer 52. The outer layer is suitably overmoulded around layer 50 suitably so that layer 50 is fully encapsulated. Layer 50 may have a thickness of 1 mm; and layer 52 may have a thickness of 0.3 mm.

Various different containers 22 and closures were made and tested as described below with reference to FIG. 5.

| Example No. | Container/Closure construction |
|---|---|
| 1 (comparative) | Container: standard (no palladium catalyst) Standard closure including no hydrogen generation means or catalyst |
| 2 (comparative) | Container: Ti818 resin containing 2 ppm palladium Closure: Layer 50 - includes sodium borohydride - 8 Wt. % in EVA (Elvax 760) Layer 52: EVA (Elvax 550) |
| 3 | Container: Flow resin (no palladium catalyst) Closure: Layer 50 - includes sodium borohydride 8 Wt. % in EVA (Elvax 760) plus 40 ppm palladium Layer 52 - EVA (Elvax 550) |
| 4 | Container: Flow resin Closure: Layer 50 - includes sodium borohydride - 8 Wt. % in EVA (Elvax 760) Layer 52 - EVA (Elvax 550) containing 40 ppm palladium |
| 5 | Container: Flow resin Closure: Layer 50 - includes sodium borohydride - 8 Wt. % in EVA (Elvax 760) plus 20 ppm palladium Layer 52 - EVA (Elvax 550) containing 20 ppm palladium |

A summary of loadings and calculated weights of palladium in the closures of the examples is provided in the table below.

| Example No. | Part | Weight of part (g) | Pd loading in part (ppm) | Pd loading in part (g) |
|---|---|---|---|---|
| 2 | Container | 21 | 2 | 0.000042 |
|  | Closure layer 50 | 0.45 | 0 | 0 |
|  | Closure layer 52 | 0.37 | 0 | 0 |
| 3 | Container | 21 | 0 | 0 |
|  | Closure layer 50 | 0.45 | 40 | 0.000018 |
|  | Closure layer 52 | 0.37 | 0 | 0 |
| 4 | Container | 21 | 0 | 0 |
|  | Closure layer 50 | 0.45 | 0 | 0 |
|  | Closure layer 52 | 0.37 | 40 | 0.0000148 |
| 5 | Container | 21 | 0 | 0 |
|  | Closure layer 50 | 0.45 | 20 | 0.000009 |
|  | Closure layer 52 | 0.37 | 20 | 0.0000074 |

EXAMPLE 6

Preparation of Container Incorporating Palladium

HyCat-1 was blended with PET at 0.1 wt. % to provide 2 ppm palladium in the resin. The blend was injection moulded into 21 g preforms and 330 ml bottles were blown from the preforms.

EXAMPLE 7

Preparation of Sodium Borohydride/EVA Compound 2.4 kg of Sodium borohydride (8 wt %) was compounded with 27.6 kg of Elvax 760 (92 wt %) on a 24 mm Thermo Fisher twin screw extruder equipped with a die face cutter. The feed zone temperature was set at 70° C. and the other zones of the extruder were set at 135° C. tapering down to 125° C. at the die. The compound was stored in a dry nitrogen atmosphere in a sealed foil bag.

EXAMPLE 8

Moulding of Sodium Borohydride/EVA Compounds (with and without Pd) into Discs (e.g. Layer 50 of FIG. 5)

The 8 wt % sodium borohydride/EVA compound of example 7 was moulded into discs (26 mm diameter and 1 mm thick) using a Boy 22M injection moulding machine. The feed zone temperature was set at 160° C. and the other zones were set at 200° C. Both the hopper and collection vessel were continuously purged with a dry nitrogen atmosphere. The moulded discs were stored in a dry nitrogen atmosphere in a sealed foil bag.

To incorporate palladium into the 8 wt % sodium borohydride/EVA moulded discs HyCat Base-1 was blended with the 8 wt % sodium borohydride/EVA compound of example 7 by tumble mixing the liquid onto the pellets prior to moulding. The quantity added was modified depending on the amount of Pd required in the final part: for 20 ppm in the final part 0.422 wt % was added, and for 40 ppm in the final part 0.844 wt % was added.

EXAMPLE 9

Moulding of Closures

The sodium borohydride/EVA injection moulded discs 50 of example 8 (with and without Pd) were incorporated into a closure using a Netstal Synergy 1750-600/230 injection moulding machine fitted with two injection moulding units and a linear indexing mould. One injection moulding unit injected an HDPE closure shell (42 in FIG. 5) and one injection moulding unit injected the EVA layer (52 in FIG. 5) to fully encompass the disc 50 containing the sodium borohydride. All injection zones were set at 200° C.

To incorporate palladium into the EVA layer (52 in FIG. 5) HyCat Base-1 was blended with the EVA by tumble mixing the liquid onto the pellets prior to moulding to fully encompass disc 50. The quantity added was modified depending on the amount of Pd required in the final part: for 20 ppm in the final part 0.422 wt % was added, and for 40 ppm in the final part 0.844 wt. % was added.

The moulded closures were stored in a dry nitrogen atmosphere in a sealed foil bag.

EXAMPLE 10

General Procedure for Testing Constructions of Examples 1 to 5

Figure 6:
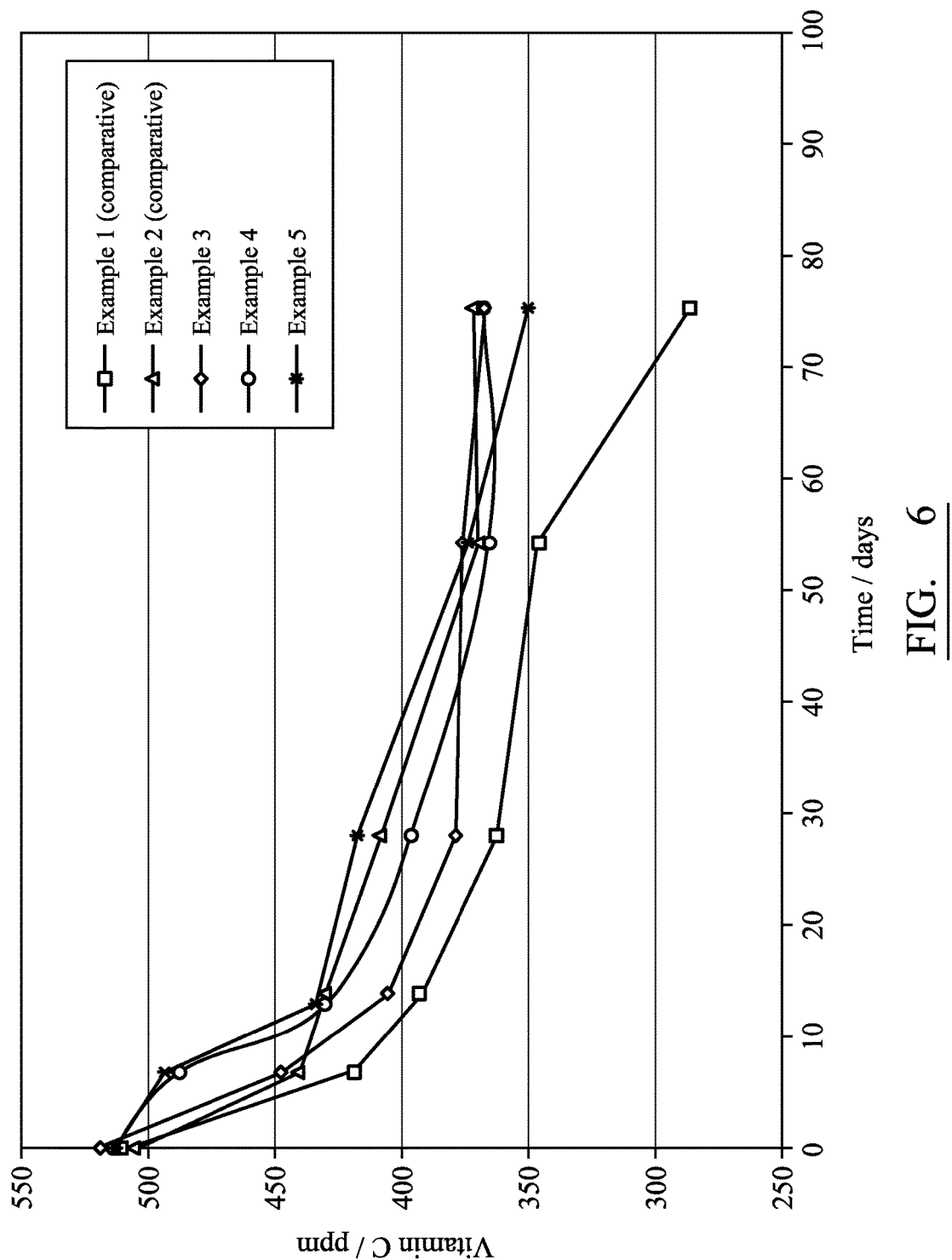
FIG. 6 is a plot of vitamin C in ppm v. time in days for a range of different containers/liners.

To each PET bottle was added a 330 ml solution of ascorbic acid (500 ppm) and biocide (Baquacil, 1,000 ppm) made up using de-ionized water. No degassing of the liquid or headspace (25 ml) in the bottle was undertaken which means the bottles are especially challenging to de-oxygenate. (Often during commercial bottling both consumables being bottled and the bottle itself are de-gassed during filling). Closures as described in examples 1 to 5 were attached to the bottles and the bottles stored at 20° C. Each of examples 1 to 5 was assessed in triplicate. At each test point, three individual bottles for each test series were tested for ascorbic acid content using a Mettler Toledo G20 Compact Titrator. Results are presented graphically in FIG. 6.

The results show that all examples (example 2 to 5) which include oxygen scavenging arrangements preserve more vitamin C over time relative to the example 1 arrangement for which there is no oxygen scavenging. Examples 3 to 5 have a similar level of performance compared to example 2. This is surprising given the fact vitamin C is very oxygen sensitive implying that rapid oxygen scavenging would be needed to protect it from oxidation, but in examples 3 to 5 the oxygen must travel a substantial distance through the beverage before it comes into contact with the palladium catalyst wherein the oxygen scavenging reaction takes place. In addition, example 2 includes more palladium catalyst (in g—see Table above) distributed throughout the bottle wall over a far greater area than in the closure of examples 3 to 5 and it would be expected that example 2 would be far superior in oxygen scavenging compared to examples 3 to 5. Thus, the cost of catalyst and other manufacturing costs can be reduced by adopting arrangements as in examples 3 to 5, whilst achieving excellent oxygen scavenging ability.

Figure 7:
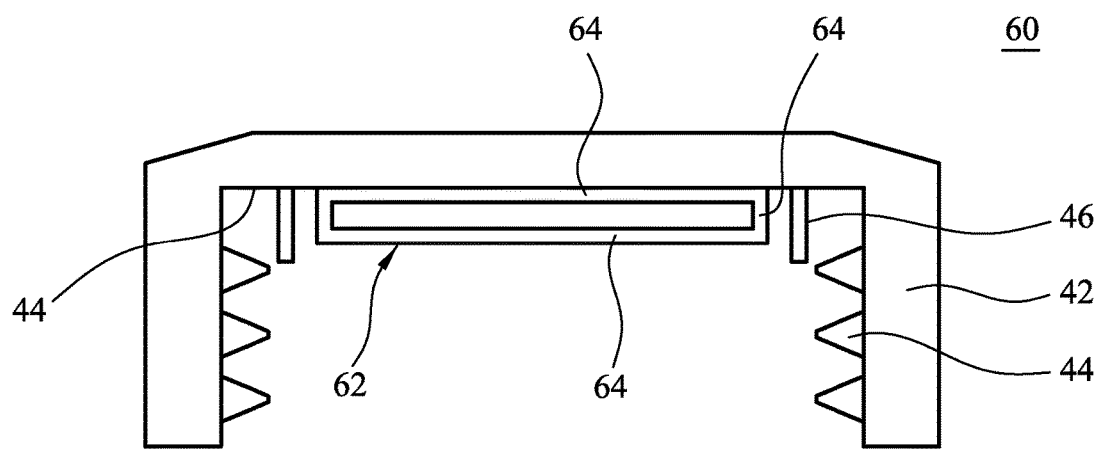
FIG. 7 is an alternative closure, partly in cross-section.

FIG. 7 shows an alternative closure 60 which differs from the closure 40 of FIG. 5 primarily in the design of insert 60. Insert 60 includes an inner layer 62 (which may be made from material(s) as described above for layer 50). Layer 62 is disc-shaped and is fully encapsulated by a layer 64 (which may be made from material(s) as described above for layer 50). Thus, layer 64 defines a core which is fully enclosed within a shell defined by layer 64.

The insert 60 is adhered to wall 49. In general terms, the insert 60 could be heat sealed, welded or glued to wall 49. Thus, the closure 60 may be made in two separate parts (i.e. insert 60 on the one hand and the shell etc on the other hand) and the parts secured together to define the closure 60 for oxygen scavenging.

In an alternative embodiment, an insert similar to insert 60 of FIG. 7 but not associated with a closure may be attached to an internal wall of a container body, for example a lower wall or a side wall. Such an insert may be thermoformed with the container body (e.g. a cup or tray). Alternatively, it may be added after the container body and/or container has been formed and in some cases could be free flowing within the container body (e.g. when an opening used to dispense products from the container is too small for the insert to pass through). Such a free floating or fixed insert, which may be in the form of a disc, patch or sachet, may be associated with various types of containers, such as cups, trays or bottles.

Figure 8:
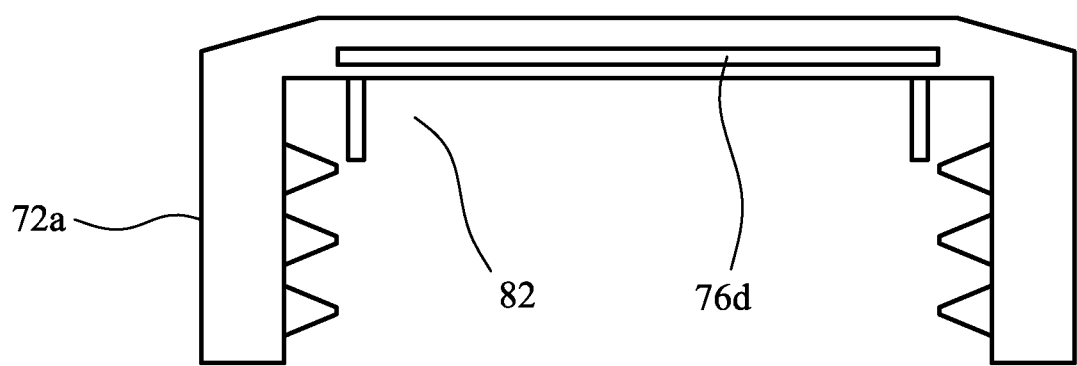
FIG. 8 is a further alternative closure, partly in cross-section.

In a further alternative embodiment shown in FIG. 8, material of the closure shell 72*a* itself acts as a barrier material to control passage of moisture to hydrogen generator 76*d* which includes active material for generating hydrogen. Closure shell 72*a* additionally includes 50 ppm of palladium catalyst for catalysing the oxygen scavenging reaction. Alternatively, (or additionally), catalyst may be associated with the hydrogen generator 76*d*, for example by being mixed therewith.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A container comprising an oxygen scavenging structure (herein referred to as the "OSS"), wherein the OSS is secured relative to a permeable container body of the container, wherein said container body includes no catalyst added for catalyzing a reaction between hydrogen and oxygen;
wherein the OSS comprises a hydrogen generating means which includes active material arranged to generate molecular hydrogen on reaction with moisture, wherein said hydrogen generating means is arranged to generate molecular hydrogen for at least 90 days, and a catalyst for catalysing a reaction between hydrogen and oxygen;
wherein said OSS includes a control means for controlling the passage of moisture to said active material;
wherein at least part of said control means is provided in a first layer and a second layer comprises said hydrogen generating means, which comprises a matrix with which said active material is associated;
wherein catalyst is dispersed in said first layer or said second layer, wherein the sum of the volume of the first and second layers is defined as the "sum-vol" in mm$^3$, and said OSS includes less than 0.20 µg of catalyst per unit of said "sum-vol" in mm$^3$; and
wherein said first layer includes at least 70 wt % of the total amount of catalyst in the OSS;
wherein said control means is arranged to control a first evolution ratio, wherein the first evolution ratio is defined as:

$$\frac{\text{the rate of evolution of hydrogen in the container}}{\text{the rate of evolution of hydrogen in the}}$$
$$\text{container over a second 5 day period starting}$$
$$\text{85 days after the end of the selected initial period}$$

and wherein said first evolution ratio is less than 4 and is greater than 0.5.

2. A container according to claim 1, wherein said OSS includes a first structure area which is defined by a face of the OSS which has the greatest area, wherein said OSS includes less than 0.01 µg of catalyst per unit area in mm$^2$ of said first structure area.

3. A container according to claim 1, wherein said catalyst is dispersed within one or more materials, wherein the material or materials within which the catalyst is dispersed occupy a first structure volume within the OSS, wherein the first structure volume is of less than 15000 mm$^3$ and is at least 100 mm$^3$.

4. A container according to claim 3, wherein said first structure volume includes 0.00000050 g to 0.000160 g of catalyst.

5. A container according to claim 1, wherein a catalyst volume-area ratio (CVR) is defined as follows:

$$CVR(\text{in mm}) = \frac{\text{total volume of material(s)}}{\text{in which catalyst is dispersed}}{\text{the area of a face of said volume}}$$
$$\text{which has the greatest area}$$

wherein said CVR is at least 0.2.

6. A container according to claim 1 wherein said first and second layers together include less than 50 ppm of catalyst.

7. A container according to claim 1, wherein the maximum thickness of said first layer is less than 5 mm and the maximum thickness of said second layer is less than 3 mm.

8. A container according to claim 1, wherein said OSS includes a catalyst-containing structure which includes three or fewer layers and said catalyst-containing structure has a surface area which is exposed to the inside of a container body in use, wherein said surface area is less than 5000 mm$^2$.

9. A container according to claim 1, wherein the ratio of the weight of hydrogen generating means divided by the weight of catalyst in said OSS is in the range 50-20000.

10. A container according to claim 1, wherein said closure includes less than 0.000200 g and at least 0.00000050 g of catalyst and/or wherein said closure includes less than 10 ppm and at least 1 ppm of catalyst based on the total weight of said closure.

11. A container according to claim 10, wherein said catalyst is dispersed within one or more materials which are associated with said closure, wherein said one or more materials occupy a first volume within the closure, wherein said first volume is less than 15000 mm$^3$ and is at least 100 mm$^3$.

12. A container according to claim 10, wherein the maximum thickness of said first layer of said closure is less than 5 mm, said first and second layers of said closure together include less than 50 ppm of catalyst and said second layer has a maximum thickness of less than 3 mm.

13. A container according to claim 10, wherein the hydrogen generating means is provided in said second layer and the ratio of the weight of hydrogen generating means divided by the weight of polymeric matrix is in the range 0.02 to 0.25; and/or the ratio of the weight of hydrogen generating means divided by the weight of catalyst in said closure is in the range 50-20000.

14. A container according to claim 1, wherein said container includes a product having an oxygen specification of 20 w/v ppm.

15. A container according to claim 1, wherein said container body has an internal volume for containing products and said OSS includes less than 0.001 µg of catalyst per unit internal volume in mm$^3$ of the container body.

16. A container according to claim 1, wherein said first layer is closer to the contents of the container body in use than said second layer.

17. A container according to claim 1, wherein said OSS is in the form of a closure which is secured relative to said container body, wherein said closure includes a screw-threaded area for releasably securing the closure to the container body.

18. A container according to claim 17, wherein said OSS includes a catalyst containing structure which includes said first layer and said second layer, wherein said catalyst-containing structure has a surface area which is exposed to the inside of the container body, wherein said surface area is less than 5000 mm$^3$.

19. A container according to claim 1, wherein said container body has an internal volume for containing products and said OSS includes less than 0.001 μg of catalyst per unit internal volume in mm$^3$ of the container body;
   wherein said first layer is closer to the contents of the container body in use than said second layer;
   wherein said OSS is in the form of a closure which is secured relative to said container body, wherein said closure includes a screw-threaded area for releasably securing the closure to the container body; and
   wherein said OSS includes a catalyst containing structure which includes said first layer and said second layer, wherein said catalyst-containing structure has a surface area which is exposed to the inside of the container body, wherein said surface area is less than 5000 mm$^3$.

20. A method of protecting an oxygen sensitive consumable against deterioration as a result of contact with oxygen, the method comprising packing the consumable in a container which includes a closure incorporating an oxygen scavenging structure (herein referred to as the "OSS"), wherein the OSS is secured relative to a permeable container body of the container, wherein said permeable container body includes no catalyst added for catalyzing a reaction between hydrogen and oxygen; wherein the OSS comprises a hydrogen generating means which includes active material arranged to generate molecular hydrogen on reaction with moisture and catalyst for catalyzing a reaction between hydrogen and oxygen;
   wherein said OSS includes a control means for controlling the passage of moisture to said active material;
   wherein at least part of said control means is provided in a first layer and a second layer comprises said hydrogen generating means, which comprises a matrix with which said active material is associated;
   wherein catalyst is dispersed in said first layer or said second layer, wherein the sum of the volume of the first and second layers is defined as the "sum-vol" in mm$^3$, and said OSS includes less than 0.20 μg of catalyst per unit of said "sum-vol" in mm$^3$, wherein said first layer includes at least 70 wt % of the total amount of catalyst in the OSS;
   wherein said hydrogen generating means is arranged to generate molecular hydrogen for at least 90 days;
   wherein said control means is arranged to control a first evolution ratio, wherein the first evolution ratio is defined as:

$$\frac{\text{the rate of evolution of hydrogen in the container over a selected initial 5 day period}}{\text{the rate of evolution of hydrogen in the container over a second 5 day period starting 85 days after the end of the selected initial period}}$$

and wherein said first evolution ratio is less than 4 and is greater than 0.5.

21. A container comprising an oxygen scavenging structure (herein referred to as the "OSS"), wherein the OSS is secured relative to a permeable container body of the container, wherein said container body includes no catalyst added for catalyzing a reaction between hydrogen and oxygen;
   wherein the OSS comprises a hydrogen generating means which includes active material arranged to generate molecular hydrogen on reaction with moisture, wherein said hydrogen generating means is arranged to generate molecular hydrogen for at least 90 days, and a catalyst for catalysing a reaction between hydrogen and oxygen;
   wherein said OSS includes a control means for controlling the passage of moisture to said active material;
   wherein at least part of said control means is provided in a first layer and a second layer comprises said hydrogen generating means, which comprises a matrix with which said active material is associated;
   wherein catalyst is dispersed in said first layer or said second layer, wherein the sum of the volume of the first and second layers is defined as the "sum-vol" in mm$^3$ and said OSS includes less than 0.20 μg of catalyst per unit of said "sum-vol" in mm$^3$;
   wherein said first layer includes at least 70 wt % of the total amount of catalyst in the OSS;
   wherein said container body has an internal volume for containing products and said OSS includes less than 0.001 μg of catalyst per unit internal volume in mm$^3$ of the container body;
   wherein said first layer is closer to the contents of the container body in use than said second layer;
   wherein said OSS is in the form of a closure which is secured relative to said container body, wherein said closure includes a screw-threaded area for releasably securing the closure to the container body;
   wherein said OSS includes a catalyst containing structure which includes said first layer and said second layer, wherein said catalyst-containing structure has a surface area which is exposed to the inside of the container body, wherein said surface area is less than 5000 mm$^3$;
   wherein a catalyst volume-area ratio (CVR) is defined as follows:

$$CVR(\text{in mm}) = \frac{\text{total volume of material(s) in which catalyst is dispersed}}{\text{the area of a face of said volume which has the greatest area}}$$

wherein said CVR is at least 0.2;
wherein said control means is arranged to control a first evolution ratio, wherein the first evolution ratio is defined as:

$$\frac{\text{the rate of evolution of hydrogen in the container over a selected initial 5 day period}}{\text{the rate of evolution of hydrogen in the container over a second 5 day period starting 85 days after the end of the selected initial period}}$$

and wherein said first evolution ratio is less than 4 and is greater than 0.5.

* * * * *